Patented Jan. 17, 1933

1,894,790

UNITED STATES PATENT OFFICE

WILLIAM L. RINTELMAN, OF MILWAUKEE, WISCONSIN, ASSIGNOR, BY MESNE ASSIGNMENTS, TO E. I. DU PONT DE NEMOURS & COMPANY, A CORPORATION OF DELAWARE

2,6-DIAMINO-ANTHRAQUINONE SULPHIDES AND PROCESS OF PREPARING THE SAME

No Drawing.  Application filed April 20, 1931. Serial No. 531,633.

This invention relates to novel sulphur derivatives of anthraquinone.

More particularly, this invention relates to novel sulphide compounds which may be derived from 1,5-dimercapto-2,6-diamino-anthraquinone and which are not only useful for the same general purposes as the 1,5-dimercapto-2,6-diamino-anthraquinone but are superior thereover in that they can be readily isolated, purified and handled in dry form.

I have found that if 1,5-dimercapto-2,6-diamino-anthraquinone is mildly oxidized, a novel reddish water-insoluble derivative, apparently a sulphide or a polysulphide, is formed. This derivative can be readily isolated in a dry state, washed, and recrystallized from sulphuric acid.

The exact constitution of this novel product is not clearly understood. The fact that it was obtained by oxidation of a mercaptan suggests that it contains disulphide groups. However, it is to be understood that I do not desire to limit myself to any particular theory of the actual structure of the product. I am therefore referring to the novel products of my invention as 2,6-diamino-anthraquinone-1,5-sulphides merely as a matter of convenience.

My novel products are useful for various purposes, particularly for the preparation of thiazole dyestuffs, as is more fully disclosed and claimed in the copending application filed by myself and Goodrich of even date herewith, Serial No. 531,634.

My novel products may be prepared by oxidizing the corresponding dimercaptan in any suitable manner, such as, for example, by blowing air through an aqueous solution of a water-soluble salt of 1,5-dimercapto-2,6-diamino-anthraquinone or by treating a suspension of the mercaptan with mild oxidizing agents. In the former case the desired product precipitates from the reaction mass, and may be isolated directly by filtration.

Without limiting my invention to any particular procedure, the following examples in which parts by weight are given, will serve to illustrate my method in its preferred form.

Example 1

1 part of 1,5-dichloro-2,6-diamino-anthraquinone, 5 parts of 50% alcohol, 2.5 parts of fused sodium sulphide, and 0.62 parts of sulphur are heated together in an autoclave for about 18–20 hours at a temperature of about 105–110° C. The alcohol is then distilled from the resulting reaction mass and the mass is next diluted with 60 parts of water. 0.6 parts of caustic soda are now added, and a stream of air is blown through the mixture until precipitation no longer takes place. The mass is now filtered and washed with water until alkali-free.

The filter-cake constitutes a brown to red mass and may be recrystallized from 90% sulphuric acid in glistening yellow crystals which are, obviously, the sulphate of the amino groups. The crystalline compound hydrolizes, upon dilution of the sulphuric acid with water, to give a bright red precipitate. The red precipitate most probably constitutes a 1,5-sulphide body of 2,6-diamino-anthraquinone. It is soluble in sulphuric acid with a yellow color.

In alkaline sodium hydrosulphite it is reduced to an orange to orange-brown solution with reddish-yellow fluorescence. It is practically insoluble in hot water, cold dilute alkali, alcohol, carbon tetrachloride and nitrobenzol. It is sparingly soluble in benzyl alcohol. If boiled in sodium polysulphide solution, it is converted back into 1,5-dimercapto-2,6-diamino-anthraquinone. When treated with benzaldehyde, it forms a yellow dyestuff of the anthraquinone thiazole series, as is more fully described and claimed in the copending application Serial No. 531,634, filed by myself and Robert J. Goodrich of even date herewith.

Example 2

The procedure is the same as in Example 1, except that instead of blowing air through the aqueous mass, powdered sodium perborate is added cautiously until precipitation is substantially complete. The further treatment of the mass to recover the oxidation product is the same as in Example 1.

Example 3

10 parts of 1,5-dimercapto-2,6-diamino-anthraquinone, obtainable, for instance, by heating 1,5-dichloro-2,6-diamino-anthraquinone with an aqueous alcoholic solution of sodium polysulphide and then precipitating the mercaptan formed with sodium bisulphite, are suspended in 200 parts of water. A current of air is passed through the mixture until a test sample shows the suspended mass to be substantially insoluble in cold dilute caustic soda solution. The mass is now filtered, washed and dried, and may be further recrystallized as in Example 1. The product is substantially identical with that obtained in Example 1.

Many variations and modifications in the specific procedure are possible without departing from the spirit of this invention, as will be readily understood by those skilled in the art.

In the claims the term "1,5-dimercapto-2,6-diamino-anthraquinone body" is meant to include and cover both the free diamino-dimercaptan as well as salts thereof, formed by neutralization of either the mercapto groups or the amino groups.

I am aware that numerous details of the process may be varied through a wide range without departing from the principles of this invention, and I, therefore, do not purpose limiting the patent granted hereon otherwise than necessitated by the prior art.

I claim as my invention:

1. As new products, sulphide derivatives of 1,5-dimercapto-2,6-diamino-anthraquinone obtainable by the oxidation of 1,5-dimercapto-2,6-diamino-anthraquinone, said products being capable of reduction by means of aqueous alkaline hydrosulphite to give an orange to orange-brown solution with reddish yellow fluorescence and being in the pure state a bright red body, substantially insoluble in water, cold dilute alkali, alcohol, or nitrobenzene, but soluble in concentrated sulphuric acid with a yellow color.

2. As a new product of manufacture, a water-insoluble oxidation product of a 1,5-dimercapto-2,6-diamino-anthraquinone body capable of reduction by means of aqueous alkaline hydrosulphite to give an orange to orange-brown solution with reddish yellow fluorescence, said product being in the pure state a bright red body, substantially insoluble in water, cold dilute alkali, alcohol, or nitrobenzene, but soluble in concentrated sulphuric acid with a yellow color.

3. As a new product of manufacture, a water-insoluble oxidation product of 1,5-dimercapto-2,6-diamino-anthraquinone.

4. The process of preparing a sulphur containing 2,6-diamino-anthraquinone derivative, which comprises treating a 1,5-dimercapto-2,6-diamino-anthraquinone body with mild oxidizing agents.

5. The process of preparing a sulphur containing 2,6-diamino-anthraquinone derivative, which comprises blowing air through an aqueous solution of a water-soluble salt of 1,5-dimercapto-2,6-diamino-anthraquinone.

6. The process of preparing a sulphur containing 2,6-diamino-anthraquinone derivative, which comprises aerating a 1,5-dimercapto-2,6-diamino-anthraquinone body.

In testimony whereof I have hereunto subscribed my name at Carrollville, Milwaukee County, Wisconsin.

WILLIAM L. RINTELMAN.